(12) United States Patent
Liang et al.

(10) Patent No.: US 12,492,087 B2
(45) Date of Patent: Dec. 9, 2025

(54) UNDERGROUND CONTAINER LOGISTICS LOADING AND UNLOADING SYSTEM BASED ON DEEP UNDERGROUND PASSAGE

(71) Applicant: Shanghai Maritime University, Shanghai (CN)

(72) Inventors: Chengji Liang, Shanghai (CN); Xiaoyuan Hu, Shanghai (CN); Daofang Chang, Shanghai (CN); Yu Wang, Shanghai (CN); Yue Zhang, Shanghai (CN); Yuting Zhang, Shanghai (CN); Yinping Gao, Shanghai (CN); Houjun Lu, Shanghai (CN); Yang Pan, Shanghai (CN)

( * ) Notice: Subject to any disclaimer, the term of this patent is extended or adjusted under 35 U.S.C. 154(b) by 187 days.

(21) Appl. No.: 18/269,594

(22) PCT Filed: Apr. 22, 2022

(86) PCT No.: PCT/CN2022/000070
§ 371 (c)(1),
(2) Date: Jun. 26, 2023

(87) PCT Pub. No.: WO2022/227686
PCT Pub. Date: Nov. 3, 2022

(65) Prior Publication Data
US 2024/0059507 A1    Feb. 22, 2024

(30) Foreign Application Priority Data
Apr. 25, 2021 (CN) .......................... 202110445454.X (51) Int. Cl.
*G06F 7/00* (2006.01)
*B65G 63/00* (2006.01)
(Continued)

(52) U.S. Cl.
CPC ......... *B65G 63/004* (2013.01); *B65G 69/001* (2013.01); *B66C 17/20* (2013.01)

(58) Field of Classification Search
CPC ...... B65G 69/001; B65G 63/00; B65G 67/00; B65G 69/00; B65G 63/002–004;
(Continued)

(56) References Cited

FOREIGN PATENT DOCUMENTS

| CN | 101293521 | 10/2008 |
|----|-----------|---------|
| CN | 108675156 B | 9/2019 |

(Continued)

*Primary Examiner* — Yolanda R Cumbess
(74) *Attorney, Agent, or Firm* — Lei Jiang (57) ABSTRACT

The invention provides an underground container logistics loading and unloading system based on a deep underground passage. The underground container logistics loading and unloading system comprises an automatic container wharf, a logistics park and the deep underground passage. The automatic container wharf is connected with the logistics park through the deep underground passage, and the deep underground passage internally comprises an area where shuttle vehicles run; and the deep underground passage comprises a main body layout area and accessory equipment. By applying the embodiment of the invention, through a vertical loading and unloading mode and an underground container logistics transportation mode, cargo transportation is realized, and transportation of ground container trucks is shunted to a certain extent, so that the ground transportation pressure of a port city is relieved, the transportation distance between the container wharf and the out-of-city logistics park is shortened.

2 Claims, 8 Drawing Sheets

(51) Int. Cl.
*B65G 69/00* (2006.01)
*B66C 17/20* (2006.01)

(58) Field of Classification Search
CPC .......... B65G 63/04; B65G 63/042–045; B65G 67/60; B65G 69/006; B65G 69/22; B66C 17/20; B66C 2700/00; B66C 17/04; G05D 1/00; G06Q 10/08; G06Q 10/083; G06Q 10/0831; G06Q 10/0833–10/087
USPC ................................ 700/213, 217–218, 228
See application file for complete search history.

(56) References Cited

FOREIGN PATENT DOCUMENTS

| | | | | |
|---|---|---|---|---|
| CN | 109319515 B | | 9/2020 | |
| CN | 110255097 B | * | 11/2020 | ............. B65G 35/00 |
| CN | 112573218 A | * | 3/2021 | ........... B65G 63/004 |
| CN | 119873407 A | * | 4/2025 | ........... B65G 63/045 |

* cited by examiner

UNDERGROUND CONTAINER LOGISTICS LOADING AND UNLOADING SYSTEM BASED ON DEEP UNDERGROUND PASSAGE

FIELD OF INVENTION

The invention relates to the technical field of underground passage transportation, and relates in particular to an underground container logistics loading and unloading system based on a deep underground passage.

BACKGROUND ART

Since 1961, container transport has maintained a high momentum of container logistics from the port to the inland is still mainly carried by road container trucks (accounting for 80%), resulting in traffic congestion outside the port, land contradiction between the port and the city, environmental pollution and other problems seriously hindering the development of the city. With the improvement of economic strength, China's container transportation has been in the forefront of the world, in 2018, Chinese ports occupy 7 seats in the top 10 global port rankings. However, much container transportation from port to inland in China needs to go through the city and occupy urban road resources, which brings great negative impact on urban development.

As a new, green and efficient container transportation system, underground container logistics system refers to the special underground container transportation system in the inland side of the port. It can replace the traditional truck transportation and reduce the influence of truck transportation on the central city. The characteristic of underground container logistics system lies in the automation and high efficiency of underground transportation mode. The traditional port container logistics system mainly adopts the road transportation mode of collecting cards. In view of the automatic container wharfs which have been built one after another, the loading and unloading efficiency has been continuously improved, and the transport of container containers has become a bottleneck. In addition, the highway transportation through the main urban areas, not only occupy urban traffic resources, but also become the main source of pollution, congestion, urban truck transportation has become the bottleneck of port city contradiction to be solved. Underground container logistics system can not only link up the loading and unloading mode of automatic container ports, but also solve the problem of insufficient container port yard resources, and it is also an effective means to solve the contradiction of port city development.

At present, although there is no lack of theoretical research on the underground container logistics system and the development and utilization of underground passage, there is a lack of vertical loading and unloading design that uses automation technology to connect the ground and the deep underground passage. The invention proposes an underground container logistics loading and unloading mode based on deep passage for the underground container logistics system, and gives its composition and operation process. Through the development of shaft and vertical loading and unloading design of three-beam fixed cranes, the transport of containers between the ground and underground is realized. Relying on the deep underground passage connecting the automatic container wharf and the inland logistics park to achieve the shortest transportation distance, using the ground AGV and underground shuttle vehicles to coordinate the horizontal transportation of containers, so as to achieve the automatic transportation of the entire process between the automatic container wharf and the inland area.

In view of this, it is necessary to put forward a new technical scheme to solve the above technical problems.

SUMMARY OF THE INVENTION

The purpose of the present invention is to provide a kind of underground container logistics loading and unloading system based on the deep underground passage, underground container logistics mode of vertical loading and transportation, carriage of goods by the way of shunt ground container truck transport, to a certain extent, and alleviate the pressure of the port city of ground transportation, shortens container wharf and logistics park outside of transportation distance, It can effectively improve the efficiency of port collection, distribution and transportation as well as the safety in the transportation process, and alleviate traffic congestion on the ground and reduce environmental pollution.

In order to achieve the above purposes, the invention adopts the following technical means:

The utility model relates to Underground container logistics loading and unloading system based on the deep underground passage, which comprises an automatic container wharf, a logistics park and the deep underground passage.

The automatic container wharf and the logistics park are connected through the deep underground passage, and the deep underground passage comprises an area for the operation of the shuttle vehicle:

The deep underground passage comprises: a main layout area and an accessory equipment.

The main layout area comprises: an underground operation area, a front buffer zone of operation area, a back buffer zone of return area, a maintenance track, a return area I, a return area II, a slope buffer zone, and a slope.

The underground operation area is below a shaft.

The front buffer zone of operation area is a preset distance from the underground operation area to be used for the shuttle vehicle parking and the front buffer zone of operation area contains a number of tracks for the shuttle vehicle waiting for unloading operation and waiting to enter the deep underground passage.

The return area I is located on one side of the underground operation area for the shuttle vehicle return.

The return area II is located on one side of the underground operation area for the shuttle vehicle return or emergency.

The back buffer zone of return area is located behind the return zone for the shuttle vehicle parking.

The maintenance track is located in the back buffer zone of return area.

The slope is located on both sides of the deep underground passage.

The slope buffer zone is located at the slope for temporary parking of the shuttle vehicle.

The accessory equipment comprises: a charging pile, a track, a drainage ditch, a blind ditch, a fire-fighting equipment, a ventilation device, a lighting device, and an emergency communication device.

The track is laid on the ground of the deep underground passage.

The charging pile is located on the track.

The walls of the deep underground passage are respectively provided with the fire-fighting equipment and the emergency communication device.

The ventilation device is located at the top of the deep underground passage.

The lighting device is located on the top of the deep underground passage.

The drainage ditch is located at both ends of the deep underground passage ground.

The blind ditch is located at both ends of the ground of the deep underground passage.

In one realization mode, the automatic container wharf comprises: a shaft, a ground operation area, an AGV operation lane, an AGV running lane, a berth, a wharf front, a wharf yard, a container freight station, a wharf parking, a three-beam fixed crane, a coast crane, an automatic stacking crane, a container truck, and an AGV;

The shaft is a node connecting the wharf ground and the deep underground passage.

The ground operation area is used to provide AGV loading and unloading operations at the shaft.

The AGV operation lane is located on both sides of the shaft for AGV loading and unloading operations.

The AGV running lane is located on both sides of the shaft for AGV operation.

The berth is used for berthing and operation of container vessels.

The wharf yard is the management area for the containers.

The container freight station is used for the packing and unpacking of containers.

The wharf parking is used for temporary parking of container trucks in an automatic container wharf.

The three-beam fixed crane is located above the shaft for loading and unloading operations on the ground AGV and underground shuttle vehicles.

The coast crane is used for loading and unloading container vessels.

The automatic stacking crane is used for loading and unloading, loading and unloading and stacking containers.

The container truck is used for carrying detachable containers.

The AGV is used to realize the transportation of containers between the wharf yard and the coast crane.

In one realization mode, the logistics park comprises: a shaft, a ground operation area, an AGV operation lane, an AGV running lane, a warehouse, a sorting area, a distribution area, a park yard, a park ground cargo loading and unloading area, a no-load AGV waiting area, a three-beam fixed crane, an AGV, a gantry crane, and a container truck.

The shaft is located on the side of the park yard and is a vertical loading/unloading connection between the logistics park surface and the deep underground passage node.

The ground operation area is used for AGV loading and unloading operations in the shaft area.

The AGV operation lane is located on both sides of the shaft for AGV loading and unloading operations.

The AGV running lane is located on both sides of the shaft for AGV operation.

The no-load AGV waiting area is located at the end of the AGV driveway near the shaft.

The park yard is located near the shaft for loading and unloading the logistics park container handover, stockpiling and storage.

The park ground cargo loading and unloading area is used for loading and unloading containers transported by ground container trucks.

The warehouse is located on one side of the ground cargo loading and unloading area of the park.

The sorting area is located at one side of the warehouse.

The distribution area is located at one side of the warehouse.

The Preferably, the deep underground passage is a two-way driveway.

Compared with the prior art, the invention brings the following technical effects:

The invention of the underground container logistics loading and unloading system based on the deep underground passage, underground container logistics mode of vertical loading and transportation, carriage of goods by the way of shunt ground container truck transport, to a certain extent, and alleviate the pressure of the port city of ground transportation, reduces the container wharf and the logistics park outside of transportation distance. It can effectively improve the efficiency of port collection, distribution and transportation as well as the safety in the transportation process, and alleviate traffic congestion on the ground and reduce environmental pollution.

BRIEF DESCRIPTION OF DRAWINGS

In order to more clearly in this invention example of technical plan, the following will be used to implement case need introduce simply the appended drawings, should understand that the following chart shows only some of the present invention, therefore should not be regarded as the range of qualified for the field common technical personnel, on the premise of not giving creative labor. Other related drawings can also be obtained from these drawings.

1. Automatic container wharf; 2. Logistics Park; 3. Deep underground passage; 4. Container; 5. Shaft; 6. Ground operation area; 7. AGV operation lane; 8. AGV running lane; 9. Berth; 10. Wharf front; 11. Wharf yard; 12. Wharf office building; 13. Maintenance room 14. Container freight station; 15. Wharf parking; 16. Wharf gate; 17. Three-beam fixed crane; 18. Slideway; 19. Beam; 20. Fixed crane lighting device; 21. Column; 22. Fixed groove; 23. Chain; 24. Motor; 25. Transmission wheel set; 26. Coast crane; 27. Automatic stacking crane; 28. Container truck; 29. AGV; 30. Warehouse; 31. Sorting area; 32. Distribution area; 33. Dispatching center; 34. Parking; 35. Park yard; 36. Park ground cargo loading and unloading area; 37. No-load AGV waiting area; 38. Gantry crane; 39. Hole; 40. Lining; 41. Underground operation area; 42. Front buffer zone of operation area; 43. Back buffer zone of return area; 44. Maintenance track; 45. Return area I; 46/47. Return Area II/Emergency area; 48. Slope buffer zone; 49. Slope; 50. Shuttle vehicle; 51. Charging pile; 52. Track; 53. Drainage ditch; 54. Blind ditch; 55. Fire-fighting equipment; 56. Ventilation device; 57. Lighting device; 58. Emergency communication device.

EMBODIMENTS

Embodiments of the invention are described in detail below, and examples of said embodiments are shown in attached drawings where identical or similar labels throughout indicate identical or similar elements or elements having the same or similar function. The embodiments described below by reference to the attached drawings are illustrative and are only used to explain the invention, not to be understood as limitations of the invention.

In the description of the invention, it is necessary to understand that the term "center", "vertical", "horizontal", "length", "width", "thickness" and "up", "down", "before" and "after", "left", "right" and "vertical", "level", "top", "bottom", "inside" and "outside", "clockwise" and "rotate", "axis", "radial" and "to the" instructions for the location or position relations. The orientation or position relations shown in the attached drawings are intended only to facilitate the description of the invention and simplify the description, and are not intended to indicate or imply that the device or component referred to must have a specific orientation, be constructed and operated in a specific orientation, and therefore shall not be construed as a limitation of the invention.

In addition, the terms "first" and "second" are used for descriptive purposes only and are not to be understood to indicate or imply relative importance or to indicate implicitly the quantity of indicated technical features. Thus, features that are qualified as "first" or "second" may include, explicitly or implicitly, one or more of these features. In the description of the invention, "multiple" means two or more, unless otherwise expressly and specifically qualified.

In the present invention, unless otherwise expressly specified and qualified, the terms "mounting", "connecting", "fastening", etc., shall be interpreted broadly, for example, as fixed connection, detachable connection, or integrated. It can be mechanical or electrical. It can be directly connected, or indirectly connected through an intermediate medium. It can be the internal connection of two components or the interaction of two components. For ordinary technicians in the field, the specific meanings of the above terms in the present invention can be understood according to the specific circumstances.

In the present invention, unless otherwise expressly specified and qualified, the first feature "above" or "below" the second feature may be in direct contact with the first and second features, or in indirect contact with the first and second features through an intermediate medium. Moreover, the first feature is "above", "above" and "above" the second feature, but the first feature is directly above or diagonally above the second feature, or merely indicates that the horizontal height of the first feature is higher than the second feature. The first feature "below", "below" and "below" the second feature can be either directly or diagonally below the second feature, or simply indicate that the horizontal height of the first feature is less than the second feature.

Implementation of the Case

This example reveals a kind of underground container loading and unloading logistics model based on the deep underground passage, underground container logistics mode of vertical loading and transportation, carriage of goods by the way of shunt ground container truck transport, to a certain extent, and alleviate the pressure of the port city of ground transportation, reduces the container wharf and the logistics park outside of transportation distance. It can effectively improve the efficiency of port collection, distribution and transportation as well as the safety in the transportation process, and alleviate traffic congestion on the ground and reduce environmental pollution.

Please refer to FIG. 1-8, the underground container logistics loading and unloading system based on the deep underground passage, including: the automatic container wharf 1, the logistics park 2 and the deep underground passage 3.

Figure 1:
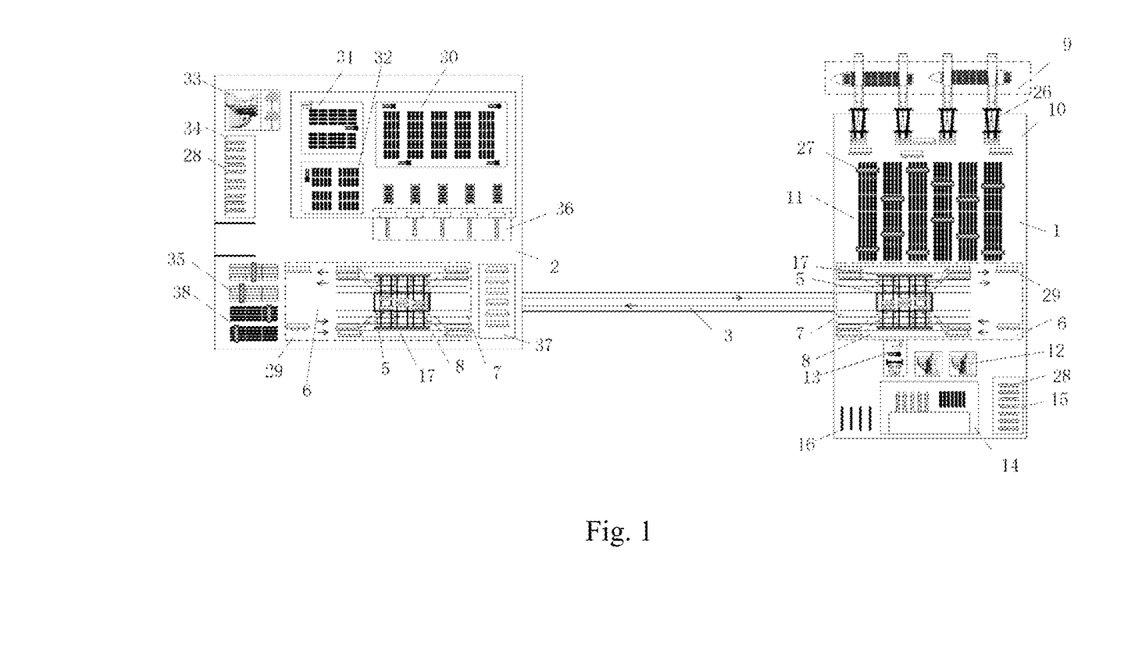
FIG. 1 is a plane flow diagram of the underground container logistics loading and unloading mode based on the deep passage in an embodiment of the invention.
Figure 2:
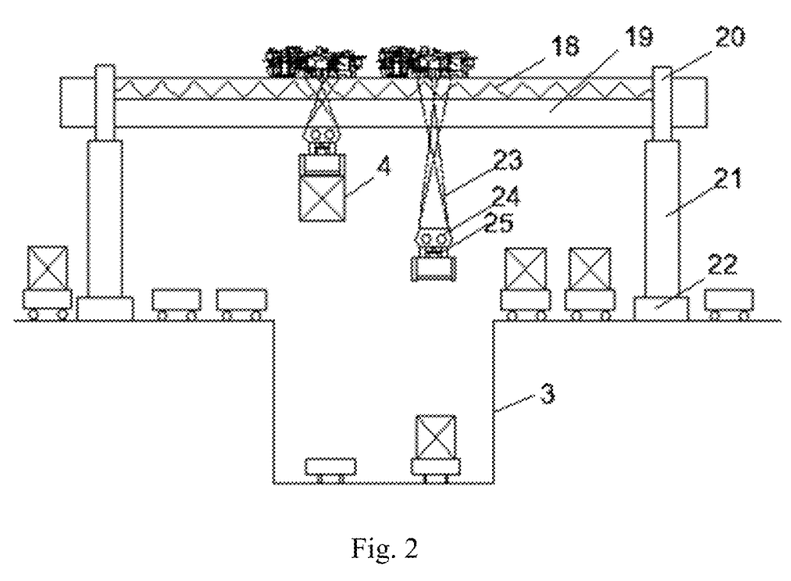
FIG. 2 is the A-A section of the shaft of the invention.
Figure 3:
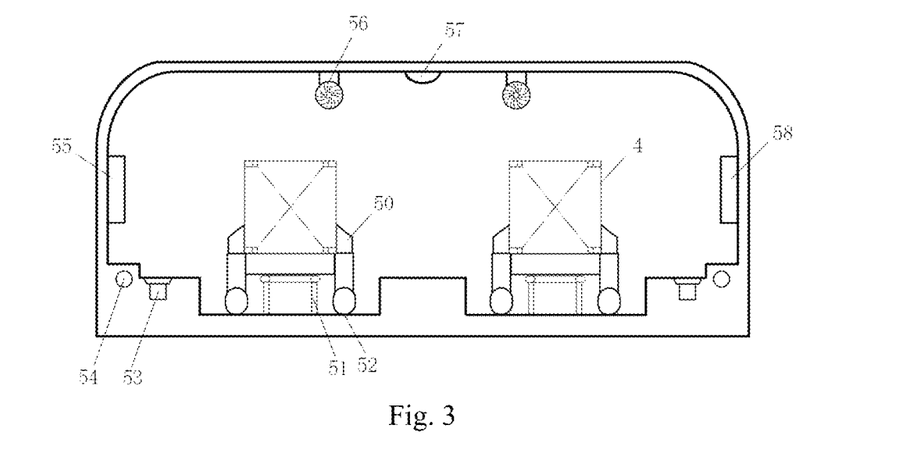
FIG. 3 is the A-A section of the deep underground passage of the invention.

The automatic container wharf 1 and the logistics park 2 are connected through the deep underground passage 3.

Figure 4:
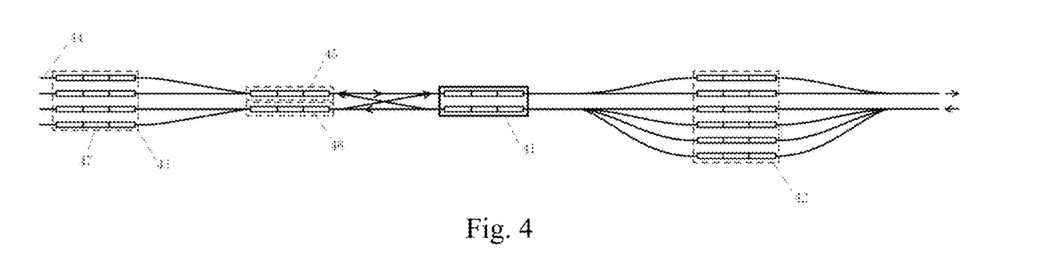
FIG. 4 is an underground B-B section of the shaft of the invention.
Figure 5:
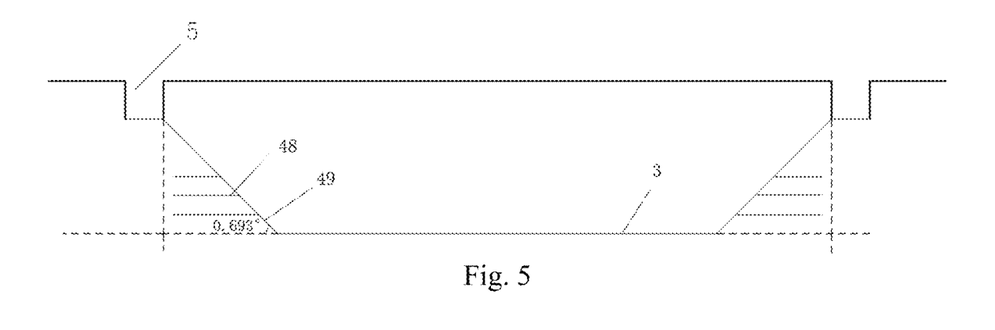
FIG. 5 is the overall A-A section of the deep underground passage of the invention.
Figure 6:
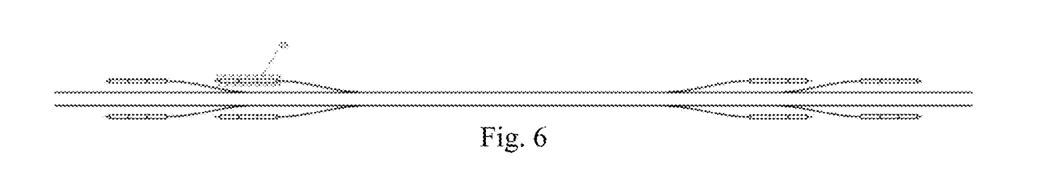
FIG. 6 is the B-B section of the deep underground passage of the invention.

Please refer to FIG. 4, the deep underground passage 3 comprises: a main layout and an accessory equipment. The main layout comprises: an underground operation area 41, a front buffer zone of operation area 42, a back buffer zone of return area 43, a maintenance track 44, a return area I 45, a return area II 46, an emergency zone 47, a slope buffer zone 48, and a slope 49. The underground operation area 41 is directly below the shaft 5, 10 meters deep underground. The front buffer zone of operation area 42 is 75 meters away from the underground operation area 41 for the shuttle vehicle 50 parking. 4 tracks in the front buffer zone of operation area 42 are used for the shuttle vehicle 50 waiting to unload boxes and 2 tracks are used for the shuttle vehicle 50 waiting to enter the deep underground passage 3. The return area I 45 is located behind the underground operation area 41 for the shuttle vehicle 50 return. The return area II/emergency area 46/47 is located behind the underground operation area 41 for the shuttle vehicle 50 return or emergency. The back buffer zone of return area 43 is located at the back of the return zone for the shuttle vehicle 50 to park. In case of failure or congestion in the return zone, the shuttle vehicle 50 can drive to the back buffer zone of return area 43 through the emergency area 47 until the problem is solved. The maintenance track 44 is located in the back buffer zone of return area 43, which is used for daily maintenance of the shuttle vehicle 50. The slope 49, located on both sides of the deep underground passage 3, is used to connect the 10 m deep section of the deep underground passage 3 to the 50 m deep section. Please refer to FIG. 5, the slope buffer zone 48 is installed at the slope 49 for temporary parking of the shuttle vehicle 50. Please refer to FIG. 3, the accessory equipment comprises: a charging pile 51, a track 52, a drainage ditch 53, a blind ditch 54, a fire-fighting equipment 55, a ventilation device 56, a lighting device 57, and an emergency communication device 58. The track 52 is laid on the surface of the deep underground passage 3, used for the shuttle vehicle 50 operation. The charging pile 51 is located on the track 52, and the charging pile 51 is set every 20 meters for power supply of the shuttle vehicle 50. One side of the deep underground passage 3 wall is provided with the fire-fighting equipment 55, the other side is provided with the emergency communication device 58. The ventilation device 56 is located at the top of the deep underground passage 3 for discharging harmful gases. The lighting device 57 is located on the top of the deep underground passage 3 and close to the wall for lighting in the passage. The drainage ditch 53 is located at both ends of the ground of the deep underground passage 3 for water diversion. The blind ditch 54 is set at both ends of the deep underground passage 3 to remove groundwater and reduce groundwater level.

It is understandable that the automatic container wharf 1 and the logistics park 2 are connected through the deep underground passage 3, and the shuttle vehicle 50 is used to the transport container 4 between the automatic container wharf 1 and the logistics park 2. The underground operation area 41 is 10 meters deep, and the main line of the deep underground passage 3 is 50 meters deep. The deep underground passage 3 is equipped with the main layout and the accessory equipment. The shuttle vehicle 50 can only be transported in the deep underground passage 3, and the deep underground passage 3 can only be operated by the shuttle vehicle 50.

It should be noted that the main layout comprises: a hole 39, a lining 40, an underground operation area 41, a front buffer zone of operation area 42, a back buffer zone of return area 43, a maintenance track 44, a return area I 45, a return area II/emergency area 46/47, a slope buffer zone 48, and a slope 49. The underground operation area 41 is located directly below the shaft 5 of the automatic container wharf 1 and the logistics park 2 respectively, which is used for loading and unloading the shuttle vehicle 50. The underground operation area 41, the front buffer zone of operation area 42, the back buffer zone of return area 43, the maintenance track 44, the return zone I 45, the return zone II/emergency zone 46/47 are located at a depth of 10 meters. The slope 49 is used to connect the 10 m deep working section of the deep underground passage 3 and the 50 m deep main transport section. The slope angle is 0.693°.

The hole 39 is used to bear the pressure of surrounding rock, bear the weight of the structure, waterproof in the cave and prevent the surrounding rock weathering. The lining 40 is a permanent structure that supports and maintains the long-term stability and durability of the deep underground passage 3. The underground operation area 41 is located directly below the shaft 5 of the automatic container wharf 1 and the logistics park 2, namely at both ends of the deep underground passage 3, which is used to realize the underground loading and unloading of the shuttle vehicle 50 in the automatic container wharf 1 and the logistics park 2. The accessory equipment is provided with the charging pile 51, the track 52, the drainage ditch 53, the blind ditch 54, the fire-fighting equipment 55, the ventilation device 56, the lighting device 57, the emergency communication device 58. The track 52 is laid on the surface of the deep underground passage 3, used for the shuttle vehicle 50 operation. The charging pile 51 is located on the track 52, and the charging pile 51 is set every 20 meters for power supply of the shuttle vehicle 50. The drainage ditch 53, located at both ends of the ground of the deep underground passage 3, is mainly used for water diversion, and directs the water flow of various water sources within the scope of the deep underground passage 3 to designated locations outside the scope of the deep underground passage 3. The blind ditch 54, located at both ends of the deep underground passage 3, is a kind of underground drainage passage, which is used to remove groundwater and reduce the groundwater level. The ventilation device 56 is located at the top of the deep underground passage 3, which is used to discharge harmful gases from construction or operation. The fire-fighting equipment 55 is located on one side of the wall of the deep underground passage 3. It is the automatic fire alarm system, fire hydrant and other fixed facilities in the deep underground passage 3, which is used to prevent and respond to fire injury accidents. The emergency communication device 58 is located on the other side of the wall of the deep underground passage 3. It provides special communication for emergency rescue in case of traffic accidents. It mainly refers to emergency alarm telephone wharf, which integrates communication, broadcasting, command and dispatch, power amplifier (30W), switching quantity, handle and other interfaces and functions. The lighting device 57 is located at the top of the deep underground passage 3 for lighting in the passage. The deep underground passage 3 avoids the congestion of ground transportation, shortens the line length between the automatic container wharf 1 and logistics park 2, keeps underground containers arriving in an orderly manner and being operated in a timely manner while relieving surface traffic congestion, reduces slope and curvature, is suitable for shuttle vehicle 50 operation, reduces manpower input, improves transport efficiency and reduces operating costs.

Preferably, the automatic container wharf 1 comprises: a shaft 5, a ground operation area 6, an AGV operation lane 7, an AGV running lane 8, a berth 9, a wharf front 10, a wharf yard 11, a wharf office building 12, a maintenance room 13, a container freight station 14, a wharf parking 34, a wharf gates 16, a three-beam fixed crane 17, a coast crane 26, an automatic stacking crane 27, a container truck, and an AGV 29. The shaft 5 is connected to the ground of the automatic container wharf 1 and the deep underground passage 3 nodes by vertical loading and unloading. The ground operation area 6 is used for loading and unloading of the AGV 29 near the shaft 5. The AGV operation lane 7, located on either side of the shaft 5, is used for the AGV 29 loading and unloading operations. The AGV running lane 8, located on both sides of the shaft 5, is used for the AGV 29 operation. The berth 9 is used for docking and operation of container vessels. The wharf yard 11, used for loading and unloading container handover, storage. The wharf office building 12 is used for the exercise of the automatic container wharf 1 facilities of the functional center organization. The maintenance room 13 is the place used for overhaul and maintenance. The container freight station 14 is used for container loading and unpacking. The wharf parking 34 is used for temporary parking of the container truck 28 in the automatic container wharf 1. The wharf gates 16 is used to distinguish internal and external responsibilities and handover related information of the automatic container wharf 1. The three-beam fixed crane 17, located directly above the shaft 5, is used for loading and unloading of the AGV 29 and the underground shuttle vehicle 50. The coast crane 26 is used for loading and unloading container vessels. The automatic stacking crane 27 is used for loading, unloading, loading and unloading and stacking containers. The container truck 28 is used for carrying detachable containers. The AGV 29 is used to transport containers between the wharf yard 11 and the coast crane 26, and to interact containers with the underground shuttle vehicle 50 by the three-beam fixed crane 17 directly above the shaft 5.

It should be noted that the automatic container wharf 1 comprises: a shaft 5, a ground operation area 6, an AGV operation lane 7, an AGV running lane 8, a berth 9, a wharf front 10, a wharf yard 11, a wharf office building 12, a maintenance room 13, a container freight station 14, a wharf parking 34, a wharf gate 16. The shaft 5 is connected to the ground of the automatic container wharf 1 and the deep underground passage 3 nodes by vertical loading and unloading. The ground operation area 6 is located on the ground on both sides of the shaft 5, specifically at the junction of the AGV operation lane 7 and the three-beam fixed crane 17. It is the area where the AGV 29 carries out box unloading and packing operations. The AGV operating lane 7 and the AGV running lane 8 are both set on both sides of the shaft 5. The AGV on both sides run in opposite directions, and 4 lanes are located on each side. The inside 2 lanes of each running direction are the AGV operating lane 7, and the outside 2 lanes are the AGV running lane 8. The AGV operating lane 7 is used for the AGV 29 loading and unloading operations. The AGV running lane 8 is only for the AGV 29 driving. The berth 9 is for container vessels to berth and operation. The wharf front 10 mainly comprises the distance from quayside line to the first rail of the coast crane 26 (seaward side), the distance between the rails of coast crane 26 and the distance from the second rail of the coast crane 26 (landside) to the front of the yard. The wharf yard 11 is used to handle the handover, storage and storage of containers from the automatic container wharf 1. The wharf office building 12 is the central organization to operate and manage the facilities of the automatic container wharf 1. The maintenance room 13 is a place for repairing and maintaining special machinery and containers in the automatic container wharf 1. The container freight station 14 is used for container loading and unpacking. The wharf parking 34 is used for temporary parking of the container truck 28 in the automatic container wharf 1. The wharf gate 16 is the place to distinguish the internal and external responsibilities of automatic container wharf 1 and to transfer relevant data. The automatic container wharf 1 is equipped with the three-beam fixed crane 17, the coast crane 26, the automatic stacking crane 27, the container truck 28, and the AGV 29. The three-beam fixed crane 17 is located directly above the shaft 5, which is used for loading and unloading of the underground shuttle vehicle 50 and ground AGV 29 to realize the interaction between underground and ground containers. The three-beam fixed lift 17 comprises: a slideway 18, a beam 19, a fixed crane lighting device 20, a column 21, a fixed groove 22, a chain 23, a motor 24, a transmission wheel set 25, a connected with the ground through the fixed groove 22, the main body is composed of three groups of beams, each group of beams 19 has 2 cars, 2 cars are set side by side, each trolley is connected with a spanner through the chain 23, which can realize the three-beam fixed crane 17 to grab 6 containers at the same time. The coast crane 26 is a professional equipment used for loading and unloading container vessels in container wharfs. The automatic stacking crane 27 used for loading, unloading, loading and unloading and stacking containers in railway container transfer yard and large container storage and transportation yard. The container truck 28 refers to a special transport vehicle for carrying detachable containers. The AGV 29 refers to a vehicle equipped with electromagnetic or optical guidance devices, which can drive according to the specified guiding route, and has a vehicle running and stopping device, safety protection device and transport containers with various load shifting functions.

In one way, the logistics park 2 comprises: a shaft 5, a ground operation area 6, an AGV operation lane 7, an AGV running lane 8, a warehouse 30, a sorting area 31, a distribution area 32, a dispatching center 33, a parking area 34, park yard 35, a park ground cargo loading and unloading area 36, a no-load AGV waiting area 37, a three-beam fixed crane 17, an AGV 29, a gantry crane 38, a container truck 28. The shaft 5 is located at the side of the park yard 35 of the park, connecting the ground of the logistics park 2 and the deep underground passage 3 nodes by vertical loading and unloading mode. The ground operation area 6 is used for loading and unloading of the AGV 29 near the shaft 5. The AGV operation lane 7, located on either side of the shaft 5, is used for the AGV 29 loading and unloading operations. The AGV running lane 8, located on both sides of the shaft 5, is used for the AGV 29 operation The no-load AGV waiting area 37, located at the end of the AGV driveway near the shaft 5, refers to the no-load waiting area after the unloading operation of the AGV 29 is completed. The park yard 35, located near the shaft 5, is used for handing over, stockpiling and storage of containers in the logistics park 2. The park ground cargo loading and unloading area 36, located in the middle of the logistics park 2, has 5 loading and unloading ports for loading and unloading containers delivered by surface container trucks 28. The warehouse 30 is located behind park ground cargo loading and unloading area 36 of the park for bulk storage of goods. The sorting area 31, located at the side of the warehouse 30, is used for automatic sorting of parcels according to certain rules. The distribution area 32, located at the side of the warehouse 30, is used to complete orders according to the requirements of the distribution to the designated location. The parking 34, located on the inside side of the gate of the logistics park 2, is used for the parking of the container trucks 28 entering and leaving the logistics park 2. The dispatching center 33 is located on the side of the parking 34 and behind the logistics park 2, which is used to establish a reasonable dispatching management organization system for the logistics park 2.

Understandably, the logistics park 2 comprises: a shaft 5, a ground operation area 6, an AGV operation lane 7, an AGV running lane 8, a warehouse 30, a sorting area 31, a distribution area 32, a dispatching center 33, a parking 34, a park yard 35, a park ground cargo loading and unloading area 36, a no-load AGV waiting area 37, a three-beam fixed crane 17, an AGV 29, a gantry crane 38, a container truck 28. The shaft 5 is located at the side of the storage yard 35 of the park, connecting the ground of the logistics park 2 and the deep underground passage 3 nodes by vertical loading and unloading mode. The ground operation area 6 is located on the ground on both sides of the shaft 5, specifically at the junction of the AGV operation lane 7 and the three-beam fixed crane 17. It is the area where the AGV 29 carries out box unloading and packing operations. The AGV operating lane 7 and the AGV running lane 8 are both set on both sides of the shaft 5. The AGV on both sides run in opposite directions, and 4 lanes are located on each side. The inside 2 lanes of each running direction are the AGV operating lane 7, and the outside 2 lanes are the AGV running lane 8. The AGV operation lane 7 is used for the AGV 29 loading and unloading operations. The AGV running lane 8 is only for the AGV 29 driving. The no-load AGV waiting area 37, located at the end of AGV driveway near the shaft 5, refers to the no-load waiting area after the unloading operation of the AGV 29 is completed. The park yard 35, located near the shaft 5, is used for handing over, stockpiling and storage of containers in the logistics park 2. The park ground cargo loading and unloading area 36, located in the middle of the logistics park 2, has 5 loading and unloading ports for loading and unloading containers delivered by surface container trucks 28. The warehouse 30 is located behind the park ground cargo loading and unloading area 36 of the park for bulk storage of goods. The sorting area 31, located at the side of the warehouse 30, is used for automatic sorting of parcels according to certain rules. The distribution area 32, located at the side of the warehouse 30, is used to complete orders according to the requirements of the distribution to the designated location. The parking 34, located on the inside side of the gate of the logistics park 2, is used for the parking of the container trucks 28 entering and leaving the logistics park 2. The dispatching center 33, located at the side of the parking 34 and behind the logistics park 2, is used to establish a reasonable dispatching management organization system for the logistics park 2. The park yard 35 is used for handing over, stockpiling and storage of containers in the park 2. The warehouse 30 is used for bulk storage of goods. The ground cargo loading and unloading area 58 is located in the middle of the park 2, a total of 5 loading and unloading ports. The sorting area 31 carries out automatic sorting of packages according to certain rules. The distribution area 32 distributed completed orders to the specified location according to the requirements. The parking 34 is used for the parking of the container trucks 28 entering and leaving the park 2. The dispatching center 33 establishes a reasonable dispatching management organization system of the park 2. The shaft 5 is located at the back of the park yard 35, connecting the park 2 ground and underground deep passage 3 node by vertical loading and unloading mode. The ground cargo loading and unloading area 1 is located at the back of the park yard 35, and is the ground and underground loading and unloading area near the shaft 5. The logistics park 2 comprises: the three-beam fixed crane 17, the AGV 29, the gantry crane 38, the container truck 28. The three-beam fixed crane 17 is located directly above the shaft 5, which is used for loading and unloading of underground shuttle vehicle 50 and ground AGV 29 to realize the interaction between underground and ground containers. The three-beam fixed lift 17 comprises: a slideway 18, a beam 19, a fixed crane lighting device 20, a column 21, a fixed groove 22, a chain 23, a motor 24, a transmission wheel set 25, connected with the ground through the fixed groove 22. The main body is composed of three groups of beams. Each group of beams 19 has 2 cars, 2 cars are set side by side. Each trolley is connected with a spanner through the chain 23, which can realize the three-beam fixed crane 17 to grab 6 containers at the same time. The gantry crane 38 is responsible for loading, unloading, loading and unloading and stacking the container 4 in the park yard 35. The AGV 29 refers to is equipped with electromagnetic or optical guiding device, can according to the regulation of direct route, with the car running and stop device, safety device, and which has the function of various transplanting transportation of container car, for the interaction of containers with the underground shuttle vehicle 50 by means of the three-beam fixed crane 17 directly above the shaft 5. The container truck 28 refers to a special transport vehicle for carrying detachable containers.

It should be noted that the Automatic Guided Vehicle (AGV) can travel through the automatic container wharf 1 and, in addition to carrying out its existing operations in the automatic container wharf. Transportation can be carried out in the ground operation area (6), the AGV operation lane (7) and the AGV running lane (8) near the shaft (5). The AGV 29 can operate in the ground operation area 6 of the logistics park 2, and the AGV 29 can also wait in the no-load AGV waiting area 37. The AGV lane is used for AGV 29 to drive.

The existing operations in the logistics park of the automatic container wharf are: the AGV can only operate (transport) at the wharf front 10 and container trucks can only operate (transport) in the area behind the wharf yard 11, i.e., near the wharf gate 16. The existing operations in the logistics park are: all ground transport is carried out by container trucks.

In embodiments of the invention, through the design within the deep underground passage 3 and can only be done by the shuttle vehicle transportation (operation), the logistics park is introduced into the AGV transportation (operation), the automatic container wharf increased with the three beams fixed shaft, the ground operation area, the AGV operation lane, the AGV running lane, the logistics park to join the three-beams with fixed hoisting the shaft, the ground operation area, the AGV operation lane, the AGV running lane, the no-load AGV waiting area and so on are related to the AGV, thus contributing to the way of AGV operation.

The AGV can operate (transport) in the AGV scope designated by the automatic container wharf 1 and the logistics park 2, but not in the deep underground passage 3. The container trucks can only be transported on the ground, and can operate (transport) in the rear of the automatic container wharf 1 and the logistics park 2, but cannot be transported in the deep underground passage 3. The shuttle vehicles can only operate in the deep underground passage 3.

Figure 7:
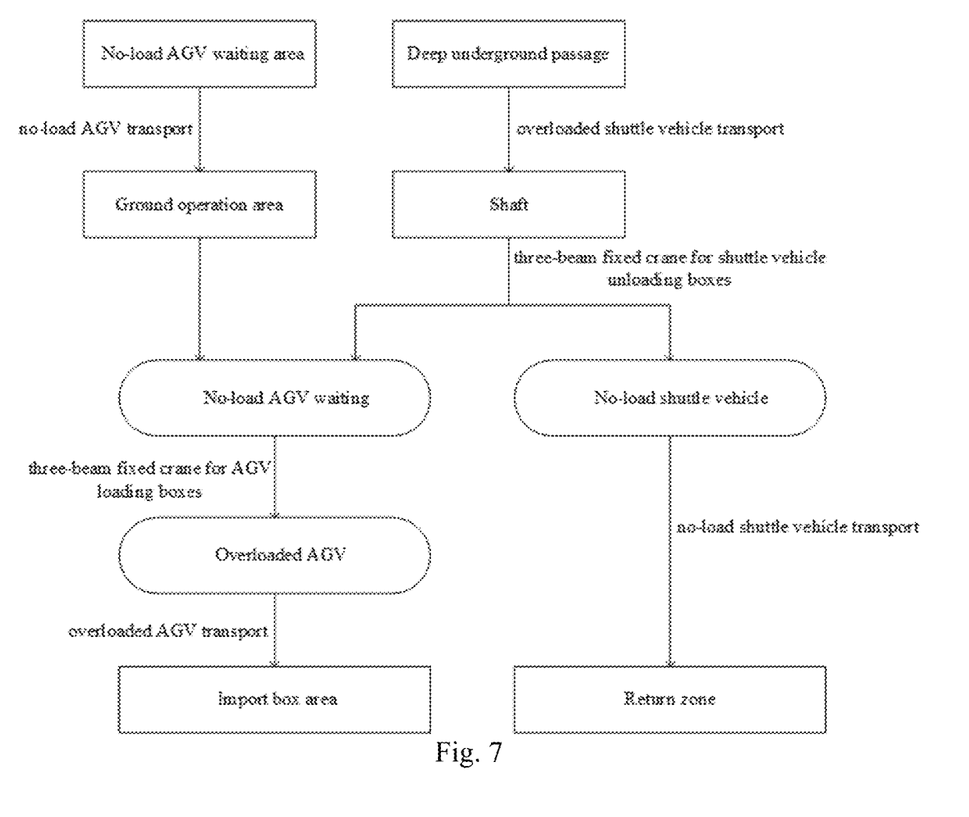
FIG. 7 and FIG. 8 constitute the overall flow chart of the overall loading and unloading process of the invention using the shaft for loading and unloading operations.
Figure 8:
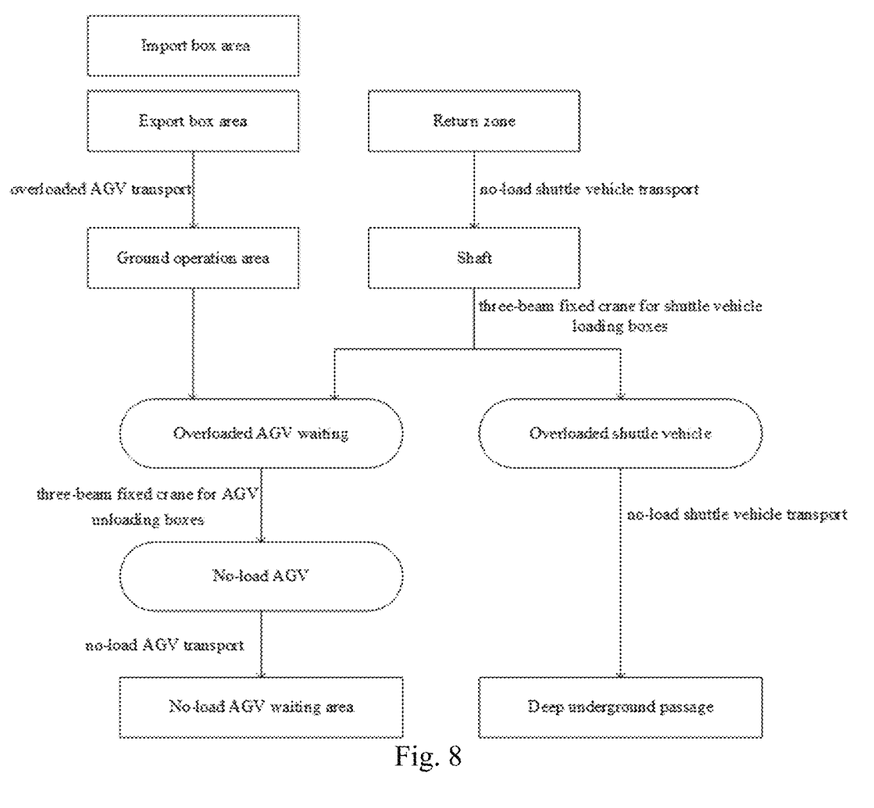

Specifically, after the introduction of the deep underground passage 3, the detailed analysis is carried out by combining the loading and unloading flow charts 7 and 8 of the automatic container wharf 1 and the logistics park 2. There are the following two routes when working:

From automatic container wharf to the logistics park:

AGV cycle: The overloaded AGV 29 of the automatic container wharfs 1 starts from the exit box area and runs along the AGV running lane 8 to the ground operation area 6. After the no-load shuttle vehicle 50 arrives at the underground operation area 41 of the first end of the automatic container wharf, three-beams fixed crane 17 to unload the AGV 29, and container 4 is placed on the shuttle vehicle 50. Then no-load AGV 29 sailing area waiting for a new load task, when the overloaded shuttle vehicle 50 reach the underground operation area 41 at the end of automatic container wharf 1, no-load AGV 29 received instruction in advance from the waiting area along the AGV running lane 8 driving to the ground operation area 6, the last overloaded AGV 29 transport container 4 to import box area.

Shuttle cycle: The overloaded shuttle vehicle 50 travels from the logistics park 2 along the deep underground passage 3 to the front buffer zone of operation area 42 at the end of the automatic container wharf 1. If the underground operation zone 41 is free, it travels to the underground operation zone 41 for unloading. If the underground operation area 41 is busy, it waits in the front buffer zone of operation area 42 until the underground operation area 41 is free. After the overloaded shuttle vehicle 50 is unloaded in the underground operation area 41 by the three-beam fixed crane 17, the no-load vehicle 50 comes to the underground operation area 41 of another track again through the return area I 45, waits for the three-beam fixed crane 17 to load it, and the overloaded shuttle vehicle 50 leaves the underground operation area 41 at the end of the automatic container wharf 1 and goes to the logistics park 2 along the deep underground passage 3.

From the logistics park to automatic container wharf:

AGV cycle: The overloaded AGV 29 in the logistics park 2 starts from the exit box area and runs along the AGV running lane 8 to the ground operation area 6. After the no-load shuttle vehicle 50 arrives at the underground operation area 41 at the end of the logistics park 2, the three-beams fixed crane 17 to the no-load AGV 29, and the container 4 is placed on the shuttle vehicle 50. Then no-load AGV 29 drives to the no-load AGV waiting area 37 to wait for the new loading task. When the heavy-load shuttle vehicle 50 arrives at the underground operation area 41 at the end of the second end of the logistics park, no-load AGV 29 receives instructions in advance to drive from the no-load AGV waiting area 37 along the AGV running lane 8 to the ground operation area 6 for packing operation. Finally, the overloaded AGV 29 will transport container 4 to the inlet container area.

Shuttle vehicle cycle: The overloaded shuttle vehicle 50 travels from the automatic container wharf 1 along the deep underground passage 3 to the front buffer zone of operation area 42 at the end of the logistics park 2. If the underground operation area 41 is free, it travels to the underground operation area 41 for unloading. If the underground operation area 41 is busy, it waits in the front buffer zone of operation area 42 until the underground operation area 41 is free. After the overloaded shuttle vehicle 50 is unloaded in the underground operation area 41 by the three-beam fixed crane 17, the no-load shuttle vehicle 50 comes to the underground operation area 41 of another track again through the return area I 45, and waits for the three-beam fixed crane 17 to load it. The overloaded shuttle vehicle 50 leaves the underground operation area 41 at the end of the logistics park 2 and goes to the automatic container wharf 1 along the deep underground passage 3.

Invention designs the deep underground passage, set up and to the corresponding working in the ground and underground operation areas, allowing for the orderly transport of containers from the automated container wharfs Ito the logistics parks, and vice versa, to realize combining the ground and underground work, also has realized the automation of logistics park in container wharf and effective connection between lines. The vertical loading and unloading mode of vertical well mouth is designed, which can save the civil construction cost and transportation cost of ramp transportation, and effectively use space resources to save the ground area of automatic container wharf and logistics park. The design of three-beam fixed crane fixed above the shaft, not only can complete the operation of three containers as a group at the same time, and the design of two trolleys in each group of beams can realize the loading and unloading at the same time, thus greatly improving the efficiency of container loading and unloading. The three-beam fixed crane is provided with a fixed groove, left and right lighting device, can realize the fixed hanging stable operation, night operation. The AGV is designed as a surface horizontal vehicle to reduce human interference and improve the overall safety of transportation operations. The ground operation area is designed with double working lanes and driving lanes in two directions on the ground to further ensure the safety of AGV operations. The deep underground passage is designed with an underground operation area, otherwise the buffer can handle of congestion in the underground areas, the occurrence of an emergency, vehicle maintenance needs, excess capacity, dock, two lanes at the same time satisfy the shuttle can be used for loading and unloading operation, return area can realize shuttle vehicle return, emergency lane can reduce the vehicle fault emergency situations such as congestion occurs. The deep underground passage design shuttle car as a horizontal transport tool, can achieve long-distance transport, design three shuttle car for a group, improve the volume of underground transport. The deep underground passage is designed with a slope to avoid the waterlogging at a depth of 50 meters below the wharf end, while facilitating the loading and unloading operations at the mouth of the shaft. The slope is designed with a buffer zone, which can be used for accident emergency on the slope. The deep underground passage is designed with a charging track to realize the real-time charging of the shuttle, and the design of drainage ditch, blind ditch, ventilation device, fire-fighting equipment, emergency communication device, lighting device, systematically enhance the safety. The magnetic nail navigation scheme is designed to achieve the precise positioning of AGV. The automatic container wharf and the logistics park are designed with the shaft and its corresponding ground and underground operation areas, which is helpful to realize the efficient opposite transportation of shuttle vehicles in the deep underground passage. The logistics park is designed with the no-load AGV waiting area, which is convenient for AGV to go to the designated operation area after receiving the task instruction, realizing the dual transportation of AGV, improving the transportation efficiency of AGV and reducing the transportation cost. The layout of the automatic container wharf, the logistics park and the deep underground passage is designed. Each area has distinct functions, coordinated and orderly, so that the whole underground container logistics system can realize efficient, safe, unified and orderly operation, and realize the effective connection between the automatic container wharf and the logistics park.

In the description of this specification, references to the terms "one embodiment", "embodiments", "examples", "concrete examples", or "examples", etc. mean that the specific features, structures, materials, or features described in combination with such embodiments or examples are contained in at least one embodiment or example of the invention. In this specification, indicative representations of the above terms need not refer to the same embodiments or examples. Furthermore, the specific features, structures, materials or features described may be combined in an appropriate manner in any one or more embodiments or examples. In addition, without contradiction, technicians in the field may combine and combine the different embodiments or examples described in this specification and the characteristics of the different embodiments or examples.

Although embodiments of the present invention have been shown and described above, it is understood that the above embodiments are exemplary and cannot be understood as a limitation of the present invention, and ordinary technicians in the field can change, modify, replace and modify the above embodiments within the scope of the present invention.

What is claimed is:

1. An underground container logistics loading and unloading system based on a deep underground passage, comprising an automatic container wharf, a logistics park, and the deep underground passage;
   the automatic container wharf pack comprises a shaft, a ground operation area, an AGV operation lane, an AGV running lane, a berth, a wharf front, a wharf yard, a container freight station, a wharf parking lot, a three-beam fixed crane, a coast crane, an automatic stacking crane, a container truck, and an AGV;
   the automatic container wharf and the logistics park are connected via the deep underground passage and the deep underground passage comprises an area for operation of shuttle vehicles;
   the deep underground passage comprises a main layout area and an ancillary equipment;
   the main layout area comprises an underground operation area, a front buffer zone of the underground operation area, a back buffer zone of the underground return area, a maintenance track, a return area I, a return area II, a slope buffer zone, and a slope;
   the underground operation area is below a shaft;
   the front buffer zone of the underground operation area is separated from the underground operation area by a preset distance for shuttle vehicles parking and the front buffer zone of the underground operation area comprises multiple tracks for shuttle vehicles waiting for unloading operation and multiple tracks waiting to enter the deep underground passage;
   the return area I is located on one side of the underground operation area for shuttle vehicles return;
   the return area II is located on another side of the underground operation area for shuttle vehicles return or emergencies;

the back buffer zone of the underground return area is located behind the return zone for shuttle vehicles parking;

the maintenance track is located in the back buffer zone of the underground return area;

the slope is arranged on both sides of the deep underground passage;

the slope buffer zone is arranged on the slope for temporary parking of the shuttle vehicles;

the ancillary equipment comprises a charging pile, a track, a drainage ditch, a blind ditch, a fire-fighting equipment, a ventilation device, a lighting device, and an emergency communication device;

the shaft, connecting the node of the wharf ground and the deep underground passage;

the track is laid on the ground of the deep underground passage;

the charging pile is located on the track;

walls of the deep underground passage are respectively provided with the fire-fighting equipment and the emergency communication device;

the ventilation device is located at a top of the deep underground passage;

the lighting device is arranged at a top of the deep underground passage;

the drainage ditch is arranged at both ends of the deep underground passage;

the blind ditch being located at both ends of the ground of the deep underground passage;

the shaft is a node connecting the wharf ground and the deep underground passage;

the ground operation area is used to provide AGV loading and unloading operations at the shaft;

the AGV operation lane is located on both sides of the shaft for AGV loading and unloading operations;

the AGV running lane is located on both sides of the shaft for AGV operation;

the berth is used for berthing and operation of container vessels;

the wharf yard is a management area for containers;

the container freight station is used for the packing and unpacking of the containers;

the wharf parking lot is used for temporary parking of container trucks in the automatic container wharf;

the three-beam fixed crane is located above the shaft for loading and unloading operations on the ground AGV and underground shuttle vehicles;

the coast crane is used for loading and unloading container vessels;

the automatic stacking crane is used for loading, unloading, transporting and stacking containers;

the container truck is used for carrying detachable containers;

the AGV is used to transport containers between the wharf yard and the coast crane.

2. The underground container logistics loading and unloading system based on the deep underground passage according to claim 1, wherein the logistics park comprising: a shaft, a ground operation area, an AGV operation lane, an AGV running lane, a warehouse, a sorting area, a distribution area, a park yard, a park ground cargo loading and unloading area, a no-load AGV waiting area, a three-beam fixed crane, an AGV, a gantry crane, and a container truck:

the shaft is located on the side of the park yard and is a vertical loading/unloading connecting node connecting the logistics park surface and the deep underground passage;

the ground operation area is used for AGV loading and unloading operations in the shaft area;

the AGV operation lane is located on both sides of the shaft for AGV loading and unloading operations;

the AGV running lane is located on both sides of the shaft for AGV operation;

the no-load AGV waiting area is located at the end of the AGV driveway near the shaft;

the warehouse, is located on the side of the park ground cargo loading and unloading area;

the sorting area, is located at warehouse side;

the distribution area, is located at warehouse side;

the deep underground passage is a two-way driveway;

the park yard is located near the shaft for loading and unloading the logistics park container handover, stockpiling and storage;

the park ground cargo loading and unloading area is used for loading and unloading containers transported by ground container trucks;

the warehouse is located on one side of the ground cargo loading and unloading area of the park;

the sorting area is located on one side of the warehouse;

the distribution area is located on one side of the warehouse;

the deep underground passage is a two-way driveway.

* * * * *